Sept. 6, 1955 S. W. KATZ ET AL 2,716,990
TREATING MACHINE FOR TREATING AIR FILTERS
AND THE LIKE WITH A LIQUID
Filed July 10, 1950 2 Sheets-Sheet 1
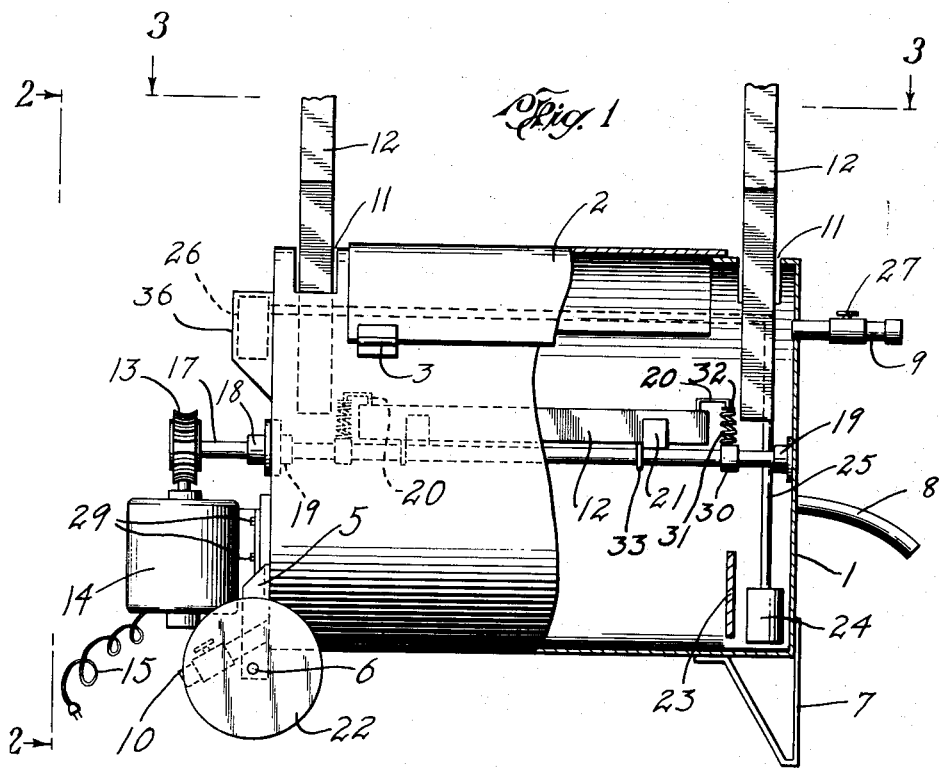
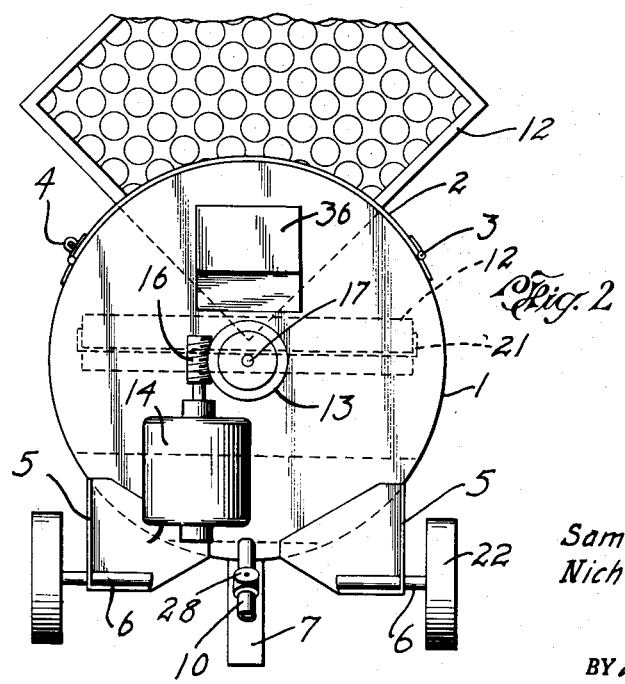
Samuel W. Katz.
Nicholas T. Salmon.
INVENTORS.
BY *Browning & Simms*
ATTORNEYS

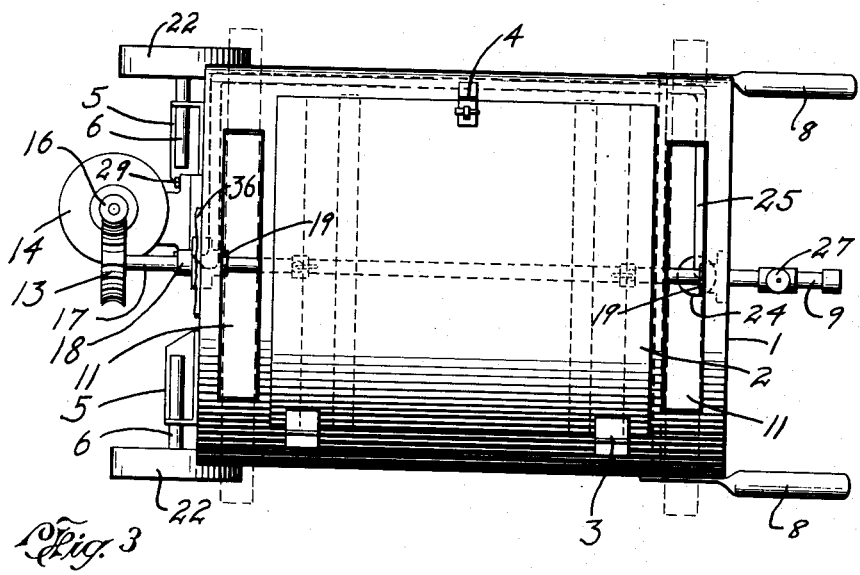
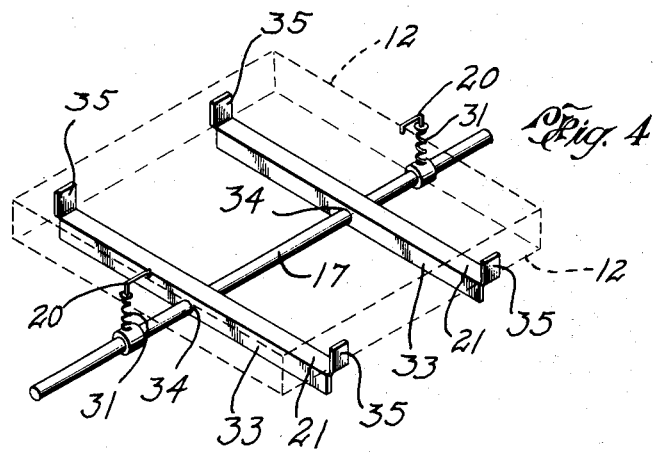
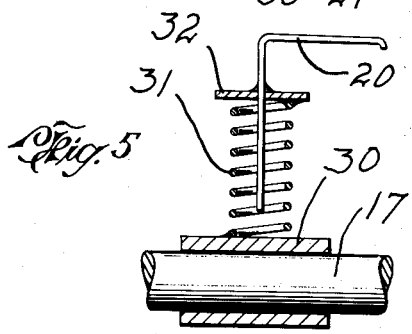
Samuel W. Katz.
Nicholas T. Salmon.
INVENTORS
ATTORNEYS United States Patent Office
2,716,990
Patented Sept. 6, 1955

2,716,990

TREATING MACHINE FOR TREATING AIR FILTERS AND THE LIKE WITH A LIQUID

Samuel W. Katz and Nicholas T. Salmon, San Antonio, Tex.

Application July 10, 1950, Serial No. 172,878

3 Claims. (Cl. 134—155)

This invention relates in general to devices for treating with a liquid such objects as air filters and the like, and has for its general object the provision of an improved cleaning and treating machine which is suitable for cleaning and treating air filters of the type used in air conditioning and heating systems.

This invention is particularly adapted for the cleaning and oiling of metal filters and the like such as are customarily used in air conditioning apparatus and in heating systems for filtering the air passing therethrough. Such filters become filled and clogged with dirt after a period of use and must be either replaced or reconditioned. Due to their expense, reconditioning of such filters is highly desirable but is economical only if it may be carried out rapidly and efficiently and at a very low cost. The washing of filters with water or with a solvent, whichever is deemed necessary, by means of merely sloshing the filter back and forth or up and down in a receptable containing such a liquid, carrying out the operation by hand, and then re-oiling the filter by immersing it in a bath of oil, and then providing a place for it to drain so as to remove excess oil, requires so much time and labor that it has been found not nearly so economical as might at first be imagined. It is for the purpose of providing a device by which these operations can be carried out more economically that the device herein disclosed has been produced.

A more specific object of this invention is to provide such a device which may be used for various types of cleaning and coating operations employing a liquid treating agent.

Another object is to provide such a device which will keep the liquid treating agent substantially free from settlings at all times during use.

Another object is to provide such a device with an improved work holding means for holding the filter or the like being treated, yet which will permit its ready release and replacement with another element to be treated.

Another object is to provide such a device in which the cleaning operation is substantially enclosed during the time it is being carried on, but in which provision is made for draining back into the device during such time liquid from units which have been previously treated.

Another object is to provide such a device which is readily portable.

Other objects and advantages of this invention will become apparent from the following description taken in connection with the accompanying drawings wherein is set forth by way of illustration and example but not by way of limitation one embodiment of the invention.

In the drawings:

Fig. 1 is a view partly in side elevation and partly in longitudinal cross section illustrating a machine constructed in accordance with this invention having one work piece or filter mounted therein in place for treatment, and two other such work pieces or filters mounted in the draining support openings in position to be drained after treatment.

Fig. 2 is an end elevation taken along the line 2—2 of Fig. 1 and showing the apparatus illustrated in Fig. 1.

Fig. 3 is a top plan view of the apparatus illustrated in Fig. 1, taken along the line 3—3 of Fig. 1, but with the work pieces removed from the draining support openings and their position merely indicated in dotted lines.

Fig. 4 is a fragmentary perspective illustrating the drive shaft of the machine shown in Figs. 1 to 3 inclusive, and illustrating the work support and work clamping structure carried thereon.

Fig. 5 is a fragmentary side elevation with parts broken away and shown in cross section illustrating the clamping mechanism for clamping the work piece on the work support as illustrated in Fig. 4.

Referring now more in detail to the drawings, the numeral 1 indicates a tank which may be of any desired cross sectional shape, but which in the instance illustrated is of cylindrical shape because such shape is usually more economical of the amount of liquid used and more efficient as a tank. This tank 1, being cylindrical, is shown with its axis substantially horizontal and with a work admitting opening in its uppermost surface of sufficient size to receive the filters or other work units to be treated. This work receiving opening is normally closed while the machine is in operation by means of a suitable closure 2 which may, if desired, be hinged at 3 and provided with a latch 4 for securing it in closed position during operation.

Secured to the lower portion of one end of the tank as by welding or other suitable means are a pair of metal gussets or brackets 5 upon which are carried stub shafts 6 projecting in opposite directions from the central plane of the tank for a purpose presently to be described. Adjacent its opposite end the tank is provided with a downwardly extending bracket or support member 7 which in this instance is a rigid support and which is secured to the tank wall and tank end as by means of welding or other suitable securing expedient.

A pair of handles 8 is secured to and projects from that end of the tank to which the bracket support 7 is secured, the purpose of these handles presently to be described.

For the purpose of filling the tank there may be provided a suitable filler pipe 9 adapted to be connected to any suitable source of liquid supply, this pipe being located adjacent the upper portion of that end of the tank to which the handles 8 are secured. Likewise, for the purpose of emptying the tank, a drain pipe 10 may be provided adjacent the opposite end of the tank and adjacent the lower side thereof.

In its upper surface adjacent its end and on opposite ends of the work admitting opening, the tank is provided with a pair of draining support openings 11 which are considerably smaller than the work admitting opening, yet are of sufficient size to admit the lower portion of a work piece to such an extent that when the work piece comes in contact with the extremities of the opening 11 it will be supported therein in position for draining and the drainage therefrom will be conducted into the interior of the tank 1. These openings 11 are also so positioned that they will not interfere with the rotation of the work piece and support and clamping structure therefor which is located within the tank and operates in the manner presently to be described. The work pieces 12 illustrated in position in the draining support openings 11 will have been treated previously in the tank 1 and may be supported in the work draining support openings 11 while additional units are under treatment in the tank.

A main drive gear 13 in the form of a driven worm wheel is adapted to be rotated through a geared connection with a motor 14 to which electrical current may be supplied through a suitable electrical connection 15. The connection between the motor 14 and the gear 13 is by means of a worm screw 16 on the shaft of the motor 14. The gear 13 is carried on the end of a shaft 17 which is shown as passing through a seal or stuffing box 18 into the interior of the tank 1. This shaft is the main shaft of this machine and is mounted in bearings 19 suitably carried on the opposite ends of the tank 1.

The shaft 17 also carries within the tank 1 suitable clamping mechanism 20 for securing a work piece 12 in place upon work supports 21, which are also rigidly carried on the shaft 17. It will be noted that the clamping means 20 and the work supports 21 are so positioned that they may receive a work piece 12 and support it between a pair of work pieces 12 carried in the draining support openings 11, and that the work piece 12 thus carried within the tank may be rotated with the shaft 17 without interference with the work pieces 12 in the draining support openings.

It will be seen that the stub shafts 6 are provided with wheels or rollers 22 which serve to support that end of the tank which is opposite the support 7. It will further be seen that with this arrangement, the entire device may be readily moved from place to place by lifting that end of the tank on which the handles 8 are mounted through grasping of such handles, and by then using the handles to hold up that end of the device on which the handles are mounted while pushing the device along on the wheels or rollers 22.

In order to provide for filtering out and removing from the body of liquid within the tank 1 such solids as may collect in the bottom thereof, there is provided a baffle 23 behind which is a pump 24 having its intake disposed so as to take in liquid and such settlings as may be present in the bottom of the tank 1. The inlet of this pump being located adjacent the bottom of the tank 1, the pump is connected by means of a conduit 25 with a portion of the tank at the opposite extremity and adjacent the upper portion of the tank, where the conduit 25 empties into a strainer or filter 26 in which the solid settlings are strained or filtered out and the liquid discharged back into the tank.

While the pump 24 is shown located adjacent the bottom portion of the tank, it will be appreciated that it might be located at any point along the conduit 25. The important feature is that the intake of the pump must be located adjacent the bottom portion of the tank so as to pick up settlings and the like contained in the liquid, and that the output from the tank discharge into the filter 26.

It will be appreciated that the intake or filler pipe 9 may be provided with a suitable valve 27 and that the outlet or drain pipe 10 may likewise be provided with a suitable valve 28, these valves being merely for the purpose of closing this filler pipe and drain pipe when the same are not in use.

The motor 14 may be mounted on the tank or any other suitable connected structure by any desired means such as the bolts or screws 29.

The clamping means for clamping the work piece in place on the work support is shown in detail in Fig. 5 in which it will be apparent that there is mounted on the shaft 17 a collar 30 for each such clamping means, this collar 30 being slidable along the shaft 17 so as to accommodate work pieces of different widths and so as to be movable completely out of the way of the work piece and permit ready removal of the work piece from the tank. To each such collar 30 is secured as by means of welding or the like a spring 31, the opposite end of this spring being secured by some similar means to a washer or plate 32. Extending through the plate 32 is the clamping member or bar in the form of an angle shaped structure as shown at 20, this structure extending through an aperture in the plate 32 and being secured therein as by welding or the like.

The work support structure on the shaft 17 is in the illustration shown to consist of a pair of bars in the form of angle members having downwardly extending flanges 33 provided with apertures 34 for the reception of the shaft 17. These bars are secured rigidly to the shaft 17 and have their work supporting surfaces facing in the same direction and disposed in a single plane so as to receive and firmly hold a flat piece of work in position for the same to be clamped in place by the clamps 20. At the opposite ends of each of the bars just described is an upturned flange portion 35 providing a stop which prevents the work piece from sliding laterally with respect to the work support.

It is thought that the operation of this invention will be clear from the description which has been given but it may be stated briefly that the device may be employed for the purpose of cleaning with water or a solvent a filter or other piece of equipment, or for coating such equipment with oil or other liquid compound and then holding the treated unit while it drains. For this purpose, the tank 1 will be filled through the filler pipe 9 with the desired liquid to a level preferably slightly above the position of the shaft 17. The work piece may then be inserted through the opening which is normally closed by the closure 2 and placed upon the work support provided by the bars 21. It may then be clamped in such position by the clamps 20 after which the cover 2 will be closed and the motor 14 started so as to rotate the shaft 17 and cause the work to be moved rapidly through the liquid within the tank.

During such operation the pump 24 may be run for the purpose of drawing up and removing any settlings from the bottom of the tank 1 and forcing such settlings with a quantity of liquid through the conduit 25 into the filter 26 where the settlings are removed from the liquid and from which the liquid is returned to the tank. It will be appreciated that the filter 26 may be placed in the tank proper but in the instance illustrated it is located in a small projecting portion of the tank as shown at 36 in order to prevent undue enlargement of the tank.

When a work piece 12 being treated within the tank has been fully treated, the motor 14 will be stopped and the cover 2 opened, the clamps 20 disengaged from the work piece and the work piece removed. The work piece may then be inserted with one corner entering into one of the draining support openings 11 and the work piece thereby supported until it has been drained of excess liquid, which excess liquid will naturally drain back into the tank 1 and not be wasted. The provision of a plurality of such draining support openings makes it possible to keep the treating tank in operation at all times and still allow each unit ample time in which to drain. More drainage support openings can be provided if found desirable by merely enlarging the tank sufficiently to make room for such.

At any time that it becomes desirable to move the device from one place to another in order to locate it closer to the work to be performed, this may be done by merely lifting on the handles 8 and pushing the device along after the fashion of a wheelbarrow.

It will be seen that a means has been provided whereby all of the objects and advantages of this invention may be secured. It will be noted, however, that variations therefrom may be made within the scope of the appended claims without departing from the spirit or scope of this invention.

What is claimed is:

1. In a machine for treating air filters and the like with a liquid, a treating tank having a work admitting opening in one side thereof to admit work pieces to the interior of said tank and adapted to be disposed upwardly during operation of the machine, a closure for said opening, a shaft rotatably mounted in said tank, means for rotating said shaft, a work support secured to and extending transversely of said shaft, and clamps slidably movable longitudinally of the shaft and work support for clamping a work piece against said work support.

2. In a machine for treating air filters and the like with a liquid, a treating tank having a work admitting opening in one side thereof to admit work pieces to the interior of said tank and adapted to be disposed upwardly during operation of the machine, a closure for said opening, a shaft rotatably mounted in said tank, means for rotating said shaft, a work support comprising a plurality of bars secured to said shaft and extending transversely thereof, each of said bars having a work receiving surface thereon facing away from said shaft and disposed in the same plane as the corresponding work receiving surface of the next bar, and clamps for clamping a work piece against said work support, said clamps being slidable on the shaft for movement longitudinally thereover relative to the work support.

3. In a machine for treating air filters and the like with a liquid, a treating tank having a work admitting opening in one side thereof to admit work pieces to the interior of said tank and adapted to be disposed upwardly during operation of the machine, a closure for said opening, a shaft rotatably mounted in said tank, means for rotating said shaft, a work support comprising a plurality of bars secured to said shaft and extending transversely thereof, each of said bars having a work receiving surface thereon facing away from said shaft and disposed in the same plane as the corresponding surface of the next bar, a stop at the extremity of each of said work receiving surfaces, and clamps for clamping a work piece against said work receiving surfaces, said clamps being slidable on the shaft for movement longitudinally thereover relative to the work support.

References Cited in the file of this patent
UNITED STATES PATENTS

| Number | Name | Date |
|---|---|---|
| 781,713 | Cahill | Feb. 7, 1905 |
| 855,089 | Bonathan | May 28, 1907 |
| 1,048,862 | Nesbitt | Dec. 3, 1912 |
| 1,559,346 | Moore | Oct. 27, 1925 |
| 1,583,657 | Chapman | May 4, 1926 |
| 1,605,961 | Loew | Nov. 9, 1926 |
| 1,644,082 | Preble | Oct. 4, 1927 |
| 1,662,496 | Forsgard | Mar. 13, 1928 |
| 1,745,466 | Anschicks | Feb. 4, 1930 |
| 1,847,471 | Chafee | Mar. 1, 1932 |
| 1,867,533 | Svelflow | July 12, 1932 |
| 2,156,594 | Lester | May 2, 1939 |
| 2,302,809 | Stehlik | Nov. 24, 1942 |
| 2,352,356 | Albertson | June 27, 1944 |
| 2,403,348 | Dinetz | July 2, 1946 |
| 2,562,076 | Weisselberg | July 24, 1951 |